(12) United States Patent
Fukei et al.

(10) Patent No.: US 9,279,743 B2
(45) Date of Patent: Mar. 8, 2016

(54) INSPECTION METHOD FOR INSPECTING ELECTRIC DRIVE APPARATUS

(71) Applicant: HONDA MOTOR CO., LTD., Tokyo (JP)

(72) Inventors: Hirotsune Fukei, Tokyo (JP); Manato Saitou, Tokyo (JP); Yoshitaka Hirai, Tokyo (JP); Minoru Tsuchida, Tokyo (JP); Masahide Ueda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/537,938

(22) Filed: Nov. 11, 2014

(65) Prior Publication Data

US 2015/0134195 A1    May 14, 2015

(30) Foreign Application Priority Data

Nov. 14, 2013  (JP) ................................. 2013-236226

(51) Int. Cl.
| | | |
|---|---|---|
| G07C 5/00 | (2006.01) | |
| G01M 17/00 | (2006.01) | |
| G06F 7/00 | (2006.01) | |
| G06F 19/00 | (2011.01) | |
| G01M 15/05 | (2006.01) | |
| G01M 13/02 | (2006.01) | |

(52) U.S. Cl.
CPC ............ *G01M 15/05* (2013.01); *G01M 13/022* (2013.01)

(58) Field of Classification Search
CPC ........................... G01M 17/007; G07C 5/0808
USPC .......................................................... 701/32.8
See application file for complete search history.

(56) References Cited

FOREIGN PATENT DOCUMENTS

| | | |
|---|---|---|
| JP | 07-055647 | 3/1995 |
| JP | 4191001 | 9/2008 |
| JP | 2012-224184 | 11/2012 |

OTHER PUBLICATIONS

Japanese Office Action dated Aug. 25, 2015, with partial English translation, 5 pages.

*Primary Examiner* — Maceeh Anwari
(74) *Attorney, Agent, or Firm* — Rankin, Hill & Clark LLP

(57) ABSTRACT

An inspection method of the present invention performs a step of giving the electric motor an instructing for rotating a foot shaft in a reverse direction and checking whether the foot shaft is rotating in the reverse direction, and a step of checking whether hydraulic pressure acting on the hydraulic pump has reached a predetermined pressure level. By checking a rotating direction of the electric motor, it is possible to check electrical connections. By checking the hydraulic pressure, it is possible to check whether there is any trouble in a hydraulic system. Namely, the present invention can perform an electrical connection check and a hydraulic pressure check in a collective fashion.

2 Claims, 6 Drawing Sheets

INSPECTION METHOD FOR INSPECTING ELECTRIC DRIVE APPARATUS

FIELD OF THE INVENTION

The present invention relates to an inspection method for inspecting hydraulic pressure etc. of an electric drive apparatus as an inspection object.

BACKGROUND OF THE INVENTION

In four-wheel-drive vehicles, where all of front and rear wheels are drive wheels, there would occur rotating speed differences between the left and right front wheels and between the left and right rear wheels, and thus, it is important to inspect respective drive systems of the vehicles. Heretofore, there have been proposed various methods for inspecting the drive systems of the four-wheel-drive vehicles, such as one disclosed in Japanese Patent No. 4191001 (hereinafter referred to as "the relevant prior patent literature").

According to the disclosure of the relevant prior patent literature, drive power is transmitted from a front-wheel differential gear, driven directly by an engine, to a rear-wheel differential gear disposed between rear wheels, via a hydraulic clutch and two hydraulic pumps. Further, a one-way clutch for mechanically connecting the rear-wheel differential gear to the front-wheel differential gear at the time of acceleration is attached to the hydraulic clutch.

Further, according to the disclosure of the relevant prior patent literature, a first connecting oil passage is provided to connect between first and second ports, and a second connecting oil passage is provided to connect between third and fourth ports. However, the first connecting oil passage may sometimes be provided to connect between the third and second ports due to an assembly mistake. Thus, there is a need to confirm that the first connecting oil passage is accurately provided to connect between the first and second ports.

Whether the oil passages are connected accurately can be confirmed also by checking behavior of the rear wheels with the vehicle set in a forward traveling state by the engine.

Further, because the one-way clutch is set in a connected or engaged state at the time of acceleration, the drive system including the one-way clutch can be checked by setting the vehicle in a forward traveling acceleration state.

As a result of remarkable enhancement of performance of electric motors in recent years, there have been proposed four-wheel-drive vehicles in which one of the front and rear wheels are driven by an engine while the other of the front and rear wheels are driven by electric motors. One specific example of such four-wheel-drive vehicles will be described with reference to FIG. 7.

Figure 7:
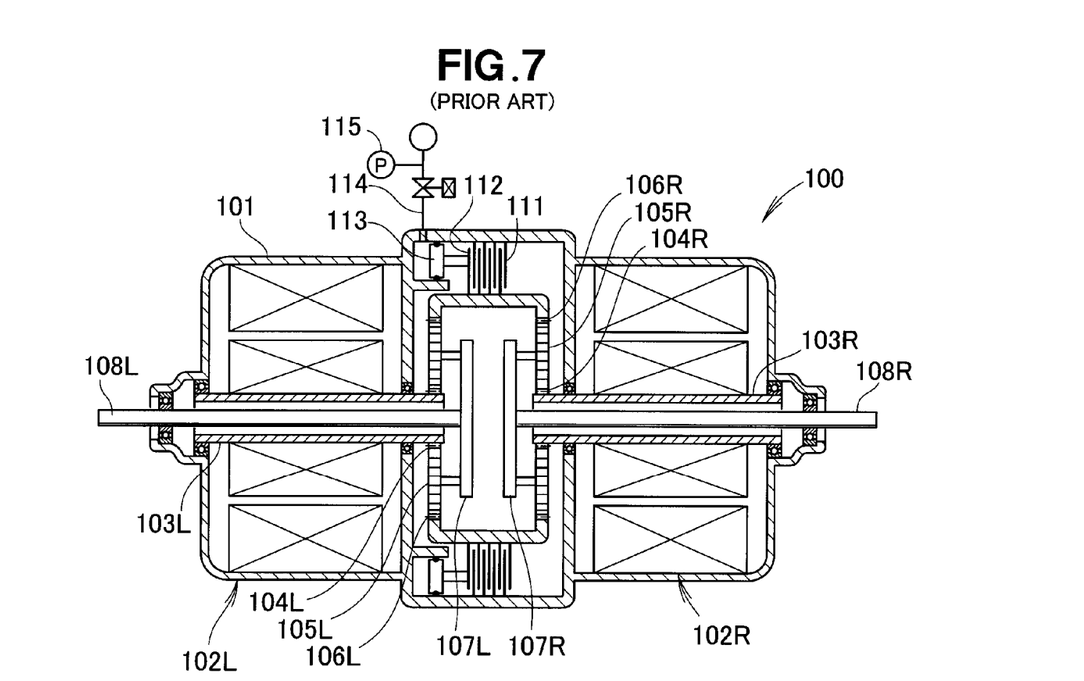
FIG. 7 is a view explanatory of the basic principles of a conventionally-known electric drive apparatus.

As shown in FIG. 7, an electric drive apparatus 100 of the four-wheel-drive vehicle includes: a case 101; a left electric motor 102L ("L" is a suffix indicating "left"); a left sun gear 104L mounted on a left motor shaft 103L; a left planet gear 105L meshing with the left sun gear 104L; a left ring gear 106L surrounding the left planet gear 105L; a left carrier 107L extending from the left planet gear 105L; and a left foot shaft 108L connected to the left carrier 107L and extending through the left motor shaft 103L. The electric drive apparatus 100 also includes: a right electric motor 102R ("R" is a suffix indicating "right"); a right sun gear 104R mounted on a right motor shaft 103R; a right planet gear 105R meshing with the right sun gear 104R; a right ring gear 106R surrounding the right planet gear 105R; a right carrier 107R extending from the right planet gear 105R; a right foot shaft 108R connected to the right carrier 107R and extending through the right motor shaft 103R; brake plates 111 and 112 extending between the left and right ring gears 106L and 106R and the case 101; a hydraulic piston 113 for pressing the brake plate 112; a hydraulic pipe 114 for supplying hydraulic pressure to the hydraulic piston 113; and a hydraulic gauge 115 mounted on the hydraulic pipe 114.

The above-mentioned left sun gear 104L, left planet gear 105L, left ring gear 106L and left carrier 107L together constitute a left planet gear mechanism, an similarly, the above-mentioned right sun gear 104R, right planet gear 105R, right ring gear 106R and right carrier 107R together constitute a right planet gear mechanism. The left planet gear mechanism is a transmission mechanism that places one of the three elements, i.e. left sun gear 104L, left ring gear 106L and left carrier 107L, in a non-rotating state by constraining the one element and the remaining two of the three elements in a rotatable state. More specifically, in the illustrated example of FIG. 8, the left ring gear 106L is placed in the non-rotatable state by the hydraulic piston 113.

Figure 8:
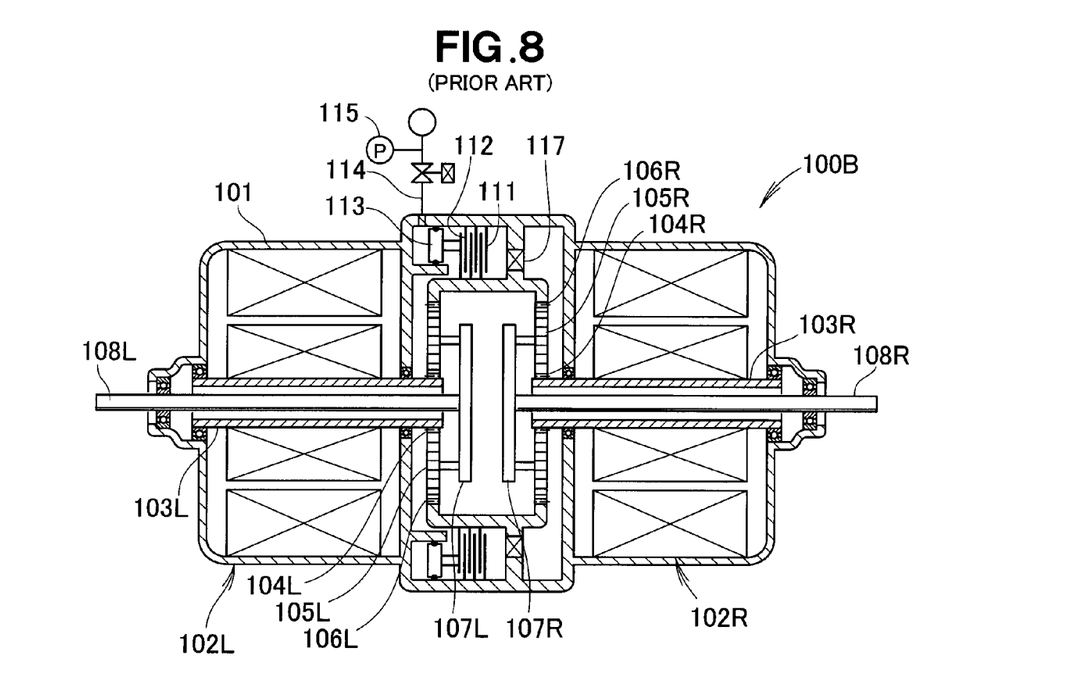
FIG. 8 is a view explanatory of the basic principles of another conventionally-known electric drive apparatus.

Once the left electric motor 102L is activated, the left sun gear 104L rotates, in response to which the left planet gear 105L rotates to revolve along the left ring gear 106L. Then, the left carrier 107L is rotated, so that the left foot shaft 108L is rotated. During that time, hydraulic pressure is continuously applied via the hydraulic pipe 114 to the hydraulic piston 113. However, because a considerable amount of energy is required to generate high hydraulic pressure, continuously applying such high hydraulic pressure to the hydraulic piston 113 as above would increase energy cost.

For the foregoing reason, there exists a need for a sophisticated electric drive apparatus which can reduce necessary hydraulic pressure generating energy. One specific example of such a sophisticated electric drive apparatus will be described below with reference to FIG. 8. As shown in FIG. 8, the electric drive apparatus 100B is characterized by being constructed by adding a one-way clutch 117 to the electric drive apparatus 100 of FIG. 7. The other elements in the electric drive apparatus 100B are similar to those in the electric drive apparatus 100 of FIG. 7 and thus will not be described here to avoid unnecessary duplication.

The one-way clutch 117 is mounted in a given orientation such that it is placed in an engaged state at the time of forward travel of the vehicle and in a disengaged state (free-rotating state) at the other times. When the left electric motor 102L rotates in the forward travel direction, the left ring gear 106L is placed in the non-rotatable state through operation of the one-way clutch 117, and thus, the hydraulic pressure can be set at a zero ("0") level during that time.

For the electric drive apparatus 100B of FIG. 8, various items are inspected during forward acceleration in the same manner as disclosed in Patent Literature 1. However, because the hydraulic pressure is at the zero ("0") level during the forward acceleration, it is not possible to inspect the hydraulic pressure, and thus, there is a need to conduct a separate inspection of a hydraulic system by applying hydraulic pressure to the hydraulic piston 113. Therefore, an increased inspection time would be required, which would adversely influence the productivity.

Thus, even with the electric drive apparatus having the one-way clutch incorporated therein, it is required to inspect the hydraulic pressure in parallel with another inspection item, because of a demand for enhanced efficiency of the inspection.

SUMMARY OF THE INVENTION

In view of the foregoing prior art problems, it is an object of the present invention to provide an improved inspection method which, even with an electric drive apparatus having a one-way clutch incorporated therein, can conduct inspection of hydraulic pressure in parallel with another inspection item.

In order to accomplish the above-mentioned object, the present invention provides an improved inspection method for inspecting an electric drive apparatus as an inspection object, the electric drive apparatus including: an electric motor; a sun gear mounted on a motor shaft of the electric motor; a planet gear meshing with the sun gear; a carrier rotatably supporting the planet gear; a foot shaft connected to the carrier; a ring gear meshing with the planet gear and surrounding the planet gear; a brake plate provided between a case enclosing the ring gear for switching the ring gear between a rotatable state and a non-rotatable state; a hydraulic piston for pressing the brake plate; and a one-way clutch provided between the case and the ring gear and constructed to place the ring gear in the non-rotatable state when the foot shaft rotates in a forward direction but place the ring gear in the rotatable state when the foot shaft rotates in a reverse direction, the method comprises: a step of giving the electric motor an instructing for rotating the foot shaft in the reverse direction and checking whether the foot shaft is rotating in the reverse direction; and a step of checking whether hydraulic pressure acting on the hydraulic piston has reached a predetermined pressure level.

The inspection method of the present invention performs the step of giving the electric motor the instructing for rotating the foot shaft in the reverse direction and checking whether the foot shaft is rotating in the reverse direction, and the step of checking whether the hydraulic pressure has reached the predetermined pressure level. By checking the rotating direction of the electric motor, it is possible to check electrical connections. By checking the hydraulic pressure, it is possible to check whether there is any trouble in a hydraulic system. Namely, the present invention can perform an electrical connection check and a hydraulic pressure check in a collective fashion. Thus, even with the electric drive apparatus having the one-way clutch incorporated therein, the present invention can provide inspection of the hydraulic pressure in parallel with another inspection item (e.g., electrical connection check).

Preferably, the electric drive apparatus includes left and right electric motors, left and right sun gears, left and right planet gears, left and right ring gears and left and right carriers, and the left and right electric motors, the left and right sun gears, the left and right planet gears, the left and right ring gears, the left and right carriers, the brake plate, the hydraulic piston and the one-way clutch are accommodated together in the case. Thus, the left and right electric motors can be checked in a parallel fashion, so that an enhanced inspection efficiency can be achieved.

Preferably, the electric drive apparatus is mounted on a vehicle, and a test is performed on the electric drive apparatus with the vehicle placed on a bench test machine. The bench test machine of a conventionally-known construction is used for the inspection. Namely, existing facilities of the bench test machine can be used as-is. As a result, checking inspection can be performed at low cost, and thus, an enhanced inspection efficiency can be achieved.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

Now, embodiments of the present invention will be described with reference to the accompanying drawings. In the following description, "forward rotation" or "rotation in a forward direction" of an electric motor corresponds to "forward travel" of a vehicle, and "reverse rotation" or "rotation in a reverse direction" of the electric motor corresponds to "rearward travel" of the vehicle.

Figure 1:
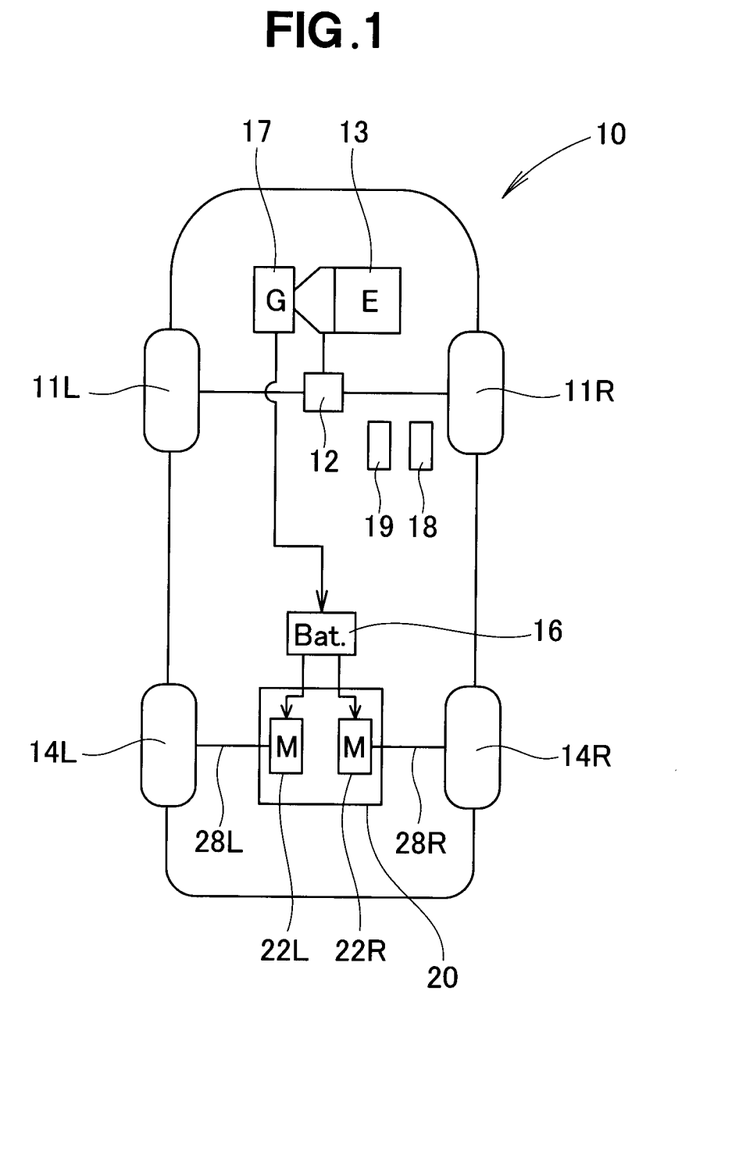
FIG. 1 is a schematic block diagram of a vehicle employing an embodiment of an electric drive apparatus the present invention.

FIG. 1 is a schematic block diagram of a vehicle 10 employing an embodiment of an electric drive apparatus 20 of the present invention. As shown, the vehicle 10 includes a front-wheel differential gear 12 between a left front wheel 11L and a right front wheel 11R, and this front-wheel differential gear 12 is driven directly by an engine 13.

The electric drive apparatus 20 is disposed between a left rear wheel 14L and a right rear wheel 14R. The left rear wheel 14L is driven by a left electric motor 22L incorporated in the electric drive apparatus 20, while the right rear wheel 14R is driven by a right electric motor 22R incorporated in the electric drive apparatus 20.

The left and right electric motors 22L and 22R are supplied with electric power from a vehicle-mounted battery 16. The vehicle-mounted battery 16 is charged by a power generator 17 driven by the engine 13. Rotating speed of the engine 13 is controlled by an operation of a vehicle-mounted accelerator 18, and the front and rear wheels 11L and 11R are controlled by an operation of a brake pedal (vehicle-mounted brake) 19.

Because the left and right front wheels 11L and 11R are driven by the engine 13 while the left and right rear wheels 14L and 14R are driven by the left and right electric motors 22L and 22R, the vehicle 10 is a four-wheel-drive vehicle. During high-speed cruising travel, power supply to the left and right electric motors 22L and 22R is stopped, so that the vehicle 10 becomes a two-wheel-drive vehicle.

Alternatively, the left and right rear wheels 14L and 14R may be driven by the engine 13, and the left and right front wheels 11L and 11R may be driven by the left and right electric motors 22L and 22R.4

Figure 2:
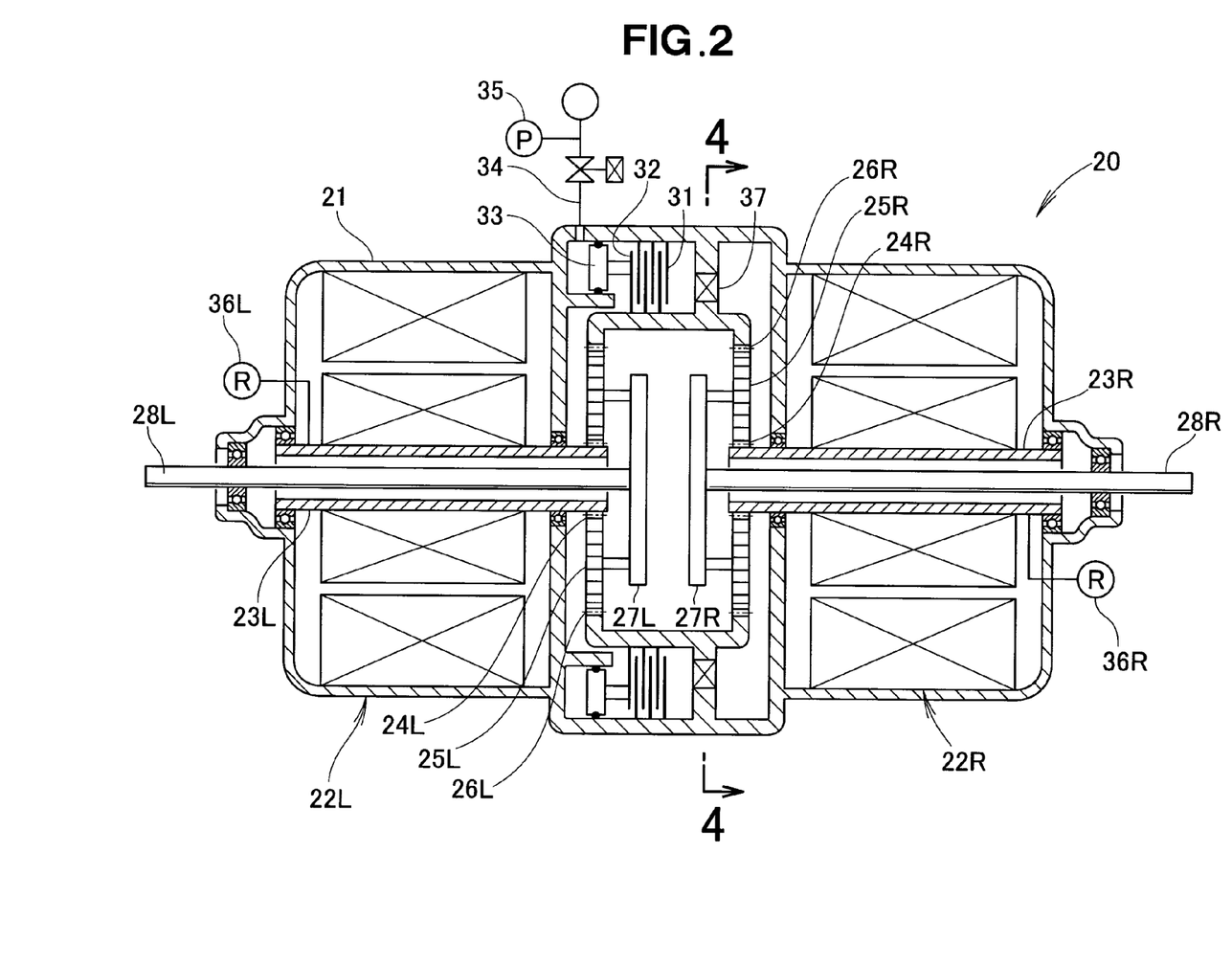
FIG. 2 is a view explanatory of basic principles of the electric drive apparatus the present invention.

The following describe, with reference to FIG. 2, a construction of the electric drive apparatus 20 in greater detail. As shown in FIG. 2, the electric drive apparatus 20 includes: a case 21; the left electric motor 22L; a left sun gear 24L mounted on a left motor shaft 23L; a left planet gear 25L meshing with the left sun gear 24L; a left ring gear 26L surrounding the left planet gear 25L; a left carrier 27L extending from the left planet gear 25L; and a left foot shaft 28L connected to the left carrier 27L and extending through the left motor shaft 23L. The electric drive apparatus 20 also includes: the right electric motor 22R; a right sun gear 24R mounted on a right motor shaft 23R; a right planet gear 25R meshing with the right sun gear 24R; a right ring gear 26R surrounding the right planet gear 25R; a right carrier 27R extending from the right planet gear 25R; and a right foot shaft 28R connected to the right carrier 27R and extending through the right motor shaft 23R. The electric drive apparatus 20 further includes: brake plates 31 and 32 extending between the left and right ring gears 26L and 26R and the case 21 for switching the ring gears between a rotatable state and a non-rotatable state; a hydraulic piston 23 for pressing the brake plate 32; a hydraulic pipe 34 for supplying hydraulic pressure to the hydraulic piston 33; a hydraulic gauge 35 provided on the hydraulic pipe 34; and a one-way clutch 37 extending between the left and right ring gears 26L and 26R and the case 21 and placed in an engaged state at the time of forward rotation of the motors.

A left rotation sensor 36L is attached to the left motor shaft 23L for constantly detecting rotating speed of the left motor shaft 23L, i.e. the number of rotation of the left electric motor 22L. Similarly, a right rotation sensor 36R is attached to the right motor shaft 23R for constantly detecting rotating speed of the right motor shaft 23R, i.e. the number of rotation of the eight electric motor 22R.

Figure 3:
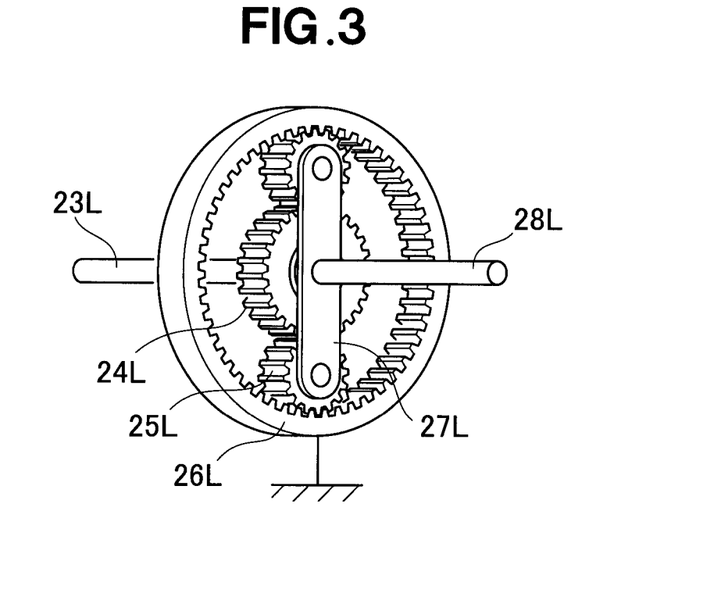
FIG. 3 is a view explanatory of basic principles of a planet gear mechanism in the electric drive apparatus.

The following describe, with reference to FIG. 3, basic operating principles of the one-way clutch in greater detail. As the left sun gear 24L is rotated by the left motor shaft 23L when the left ring gear 26L is in the non-rotatable state by being constrained in movement as shown in FIG. 3, the left planet gear 25L is rotated so that it revolves within (along the inner periphery of) the ring gear 26L. Then, the left carrier 27L rotates, thereby rotating the left foot shaft 28L. Once the left ring gear 26L becomes rotatable by being released from the constraint, no power transmission is effected any more.

Figure 4:
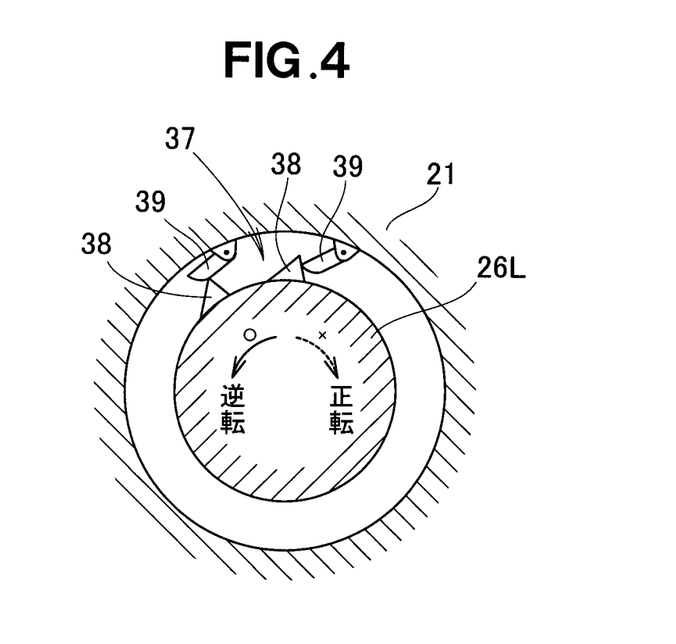
FIG. 4 is a sectional view taken along line 4-4 of FIG. 2, which is explanatory of basic operating principles of the electric drive apparatus the present invention.

Further, as shown in FIG. 4, the one-way clutch 37 is interposed between the case 21 and the left ring gear 26L. The one-way clutch 37 is a special clutch including, as its main component elements, a plurality of rhomboid-shaped pieces. However, because movement of such rhomboid-shaped pieces is very minute, an engaged state and a non-engaged state of the one-way clutch 37 cannot be distinguished from each other in the figure. Therefore, the operation of the one-way clutch 37 will be described in more detail with reference to FIG. 4 using projections 38 and oscillators 39 instead of the rhomboid-shaped pieces.

The case 21 is a stationary member. Even when torque is applied to rotate the left ring gear 26L in a clockwise direction in FIG. 4, the left ring gear 26L is prevented from rotating by the projections 38 being stopped by the oscillators 39. Namely, at the time of the forward rotation of the corresponding motor, the left ring gear 26L is placed in the non-rotatable state.

When torque is applied to rotate the left ring gear 26L in a counterclockwise direction in FIG. 4, on the other hand, the projections 38 pass under the oscillators 39. Thus, at the time of the reverse rotation of the corresponding motor, the left ring gear 26L is placed in the rotatable state.

Namely, when the electric motors 22L and 22R are rotated in the forward direction, the left and right ring gears 26L and 26R are placed in the non-rotatable state by a constraining action of the one-way clutch 37, so that the foot shafts 28L and 28R are rotated in the forward travel direction by the motors 22L and 22R.

When the electric motors 22L and 22R are rotated in other than the forward direction, the one-way clutch 37 no longer performs the constraining action, so that the left and right ring gears 26L and 26R is placed in the non-rotatable state by the hydraulic piston 33 pressing the brake plate 32 against the brake plate 31.

Next, with primary reference to FIGS. 5 and 6, a description will be given about an inspection flow intended to check operation of the vehicle 10 and particularly operation of the electric drive apparatus 20 constructed in the aforementioned manner.

First, at step ST01, the vehicle 10 is placed on a bench test machine of a conventionally known construction. Then, at step ST02, the hydraulic pressure acting on the hydraulic piston 33 is set at a "0" level, and the electric motors 22L and 22R are de-energized, so that the left and right foot shafts 28L and 28R cannot be rotated by the electric motors 22L and 22R.

Then, a shift mode of the vehicle is set at "D" at step ST03, and the vehicle-mounted accelerator 18 is depressed by a human inspector at step ST04. Then, at step ST05, the front wheels 11L and 11R starts to be rotated in the forward travel direction by means of the vehicle-mounted engine 13a, and the rear wheels 14L and 14R are rotated in the forward travel direction by rollers of the bench test machine.

Under such conditions, the respective numbers of co-rotation Nt of the left and right electric motors 22L and 22R are measured at step ST06. Even when a hydraulic clutch is OFF, the brake plate 32 may move following the brake plate 31 without the two brake plates 31 and 32 completely separating from each other. Such following movement is also called a drag phenomenon.

The electric drive apparatus 20 is determined satisfactory (acceptable) if the number of co-rotation Nt of the left electric motor 22L is a predetermined (allowable) number or below (YES determination at step ST07), but determined unsatisfactory (unacceptable) if the number of co-rotation Nt of the left electric motor 22L is over the predetermined (allowable) number (NO determination at step ST07). If the electric drive apparatus 20 is determined unsatisfactory at step ST07, it can be considered that separation between the left foot shaft 28L and the left electric motor 22L has become insufficient due to a failure of the one-way clutch 37 or the like. Thus, in such a case, it is suspected that there is some trouble or problem in the interior of the electric drive apparatus 20.

Similarly, the electric drive apparatus 20 is determined satisfactory if the number of co-rotation Nt of the right electric motor 22R is a predetermined (allowable) number or below (YES determination at step ST08), but determined unsatisfactory if the number of co-rotating rotation Nt of the right electric motor 22R is over the predetermined (allowable) number (NO determination at step ST08).

Then, the vehicle-mounted accelerator is returned to an initial position at step ST09, and the vehicle-mounted brake is depressed to stop the rotation of the front and rear wheels at step ST10.

Figure 5:
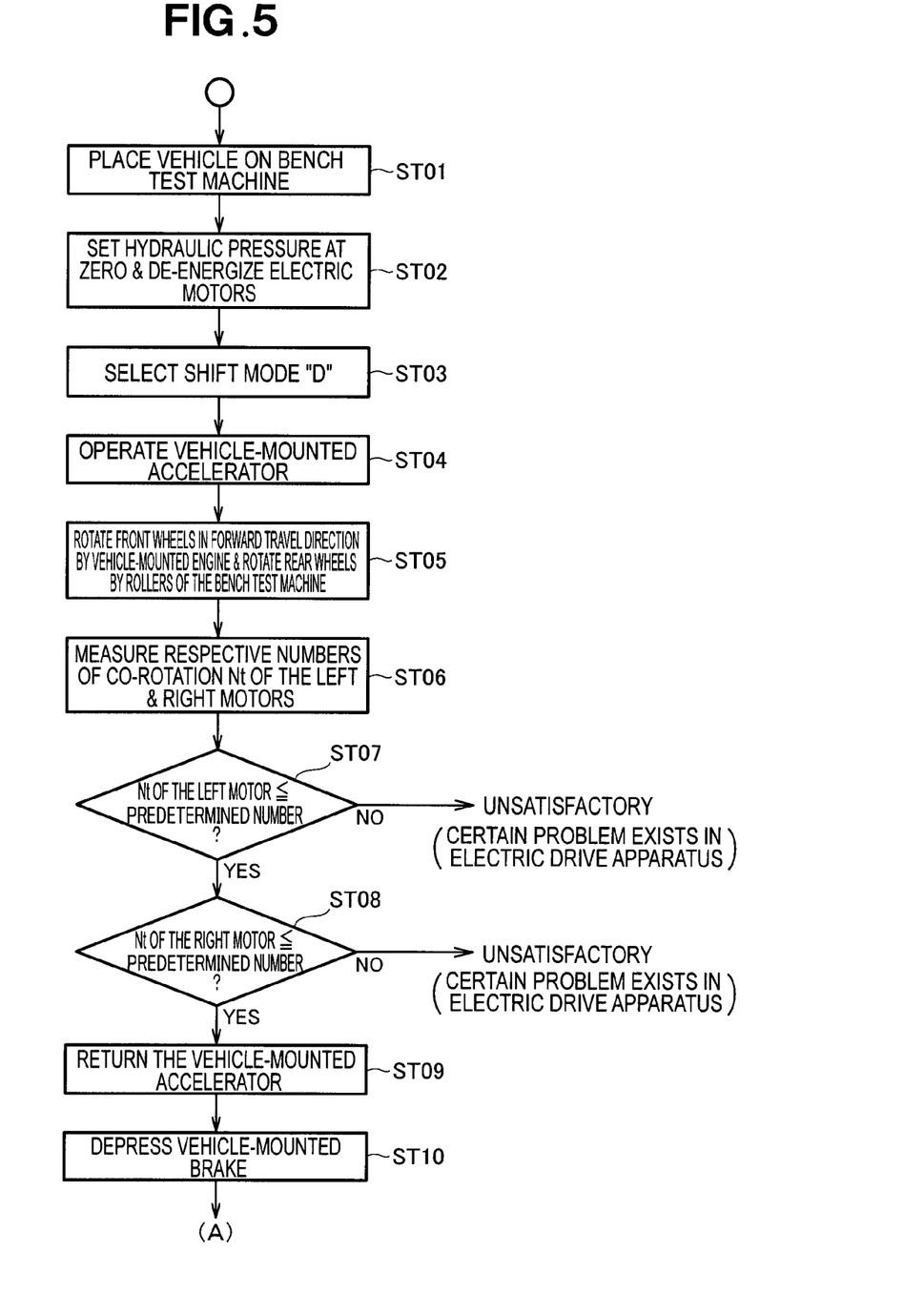
FIG. 5 is a chart showing a part of an inspection flow for checking an inner construction of electric motors in the electric drive apparatus.
Figure 6:
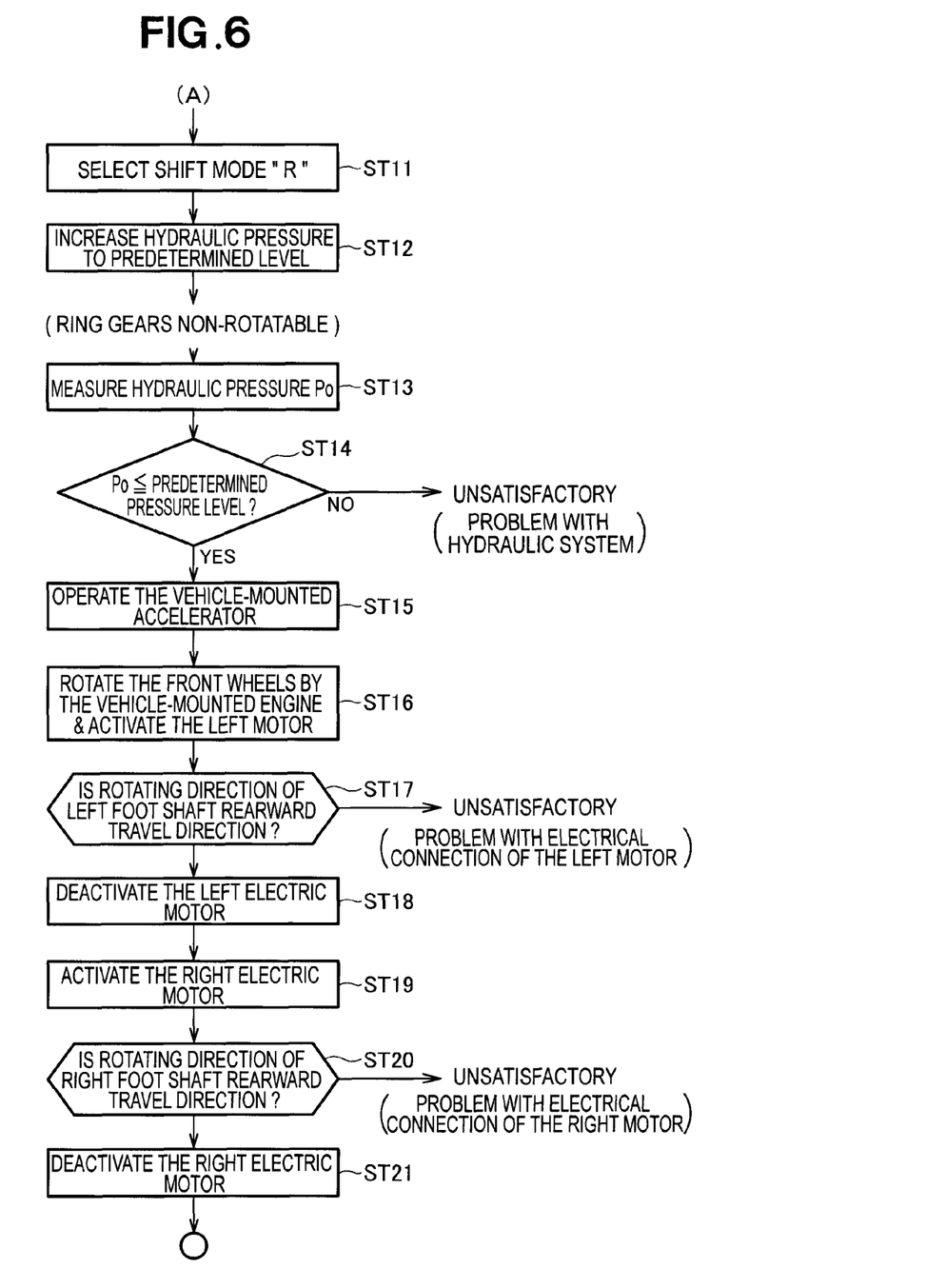
FIG. 6 is a chart showing the remaining part of the inspection flow for checking a hydraulic system and electrical connections in the electric drive apparatus.

Connector "(A)" in FIG. 5 connects to connector "(A)" in FIG. 6. At step ST11 in FIG. 6, the shift mode is set at "R". Then, at step ST12, an instruction for increasing the hydraulic pressure is generated on the basis of the shift mode setting at "R". As a consequence, the brake plates contact each other into a braking state, so that the left and right ring gears 26L and 26R are placed in the non-rotatable state. Under such conditions, the hydraulic pressure Po is measured by the hydraulic gauge 35 of FIG. 2 at step ST13.

The electric drive apparatus 20 is determined satisfactory if the measured hydraulic pressure Po is a predetermined pressure level or over (YES determination at step ST14), but determined unsatisfactory as having a trouble or problem with the hydraulic system if the measured hydraulic pressure Po is below the predetermined pressure level (NO determination at step ST14). Such a problem with the hydraulic system is presumed to be any of a failure of the hydraulic pump, mis-connection of hydraulic piping, etc.

Next, the vehicle-mounted accelerator 18 is depressed by the human inspector at step ST15 so that the front wheels 11L and 11R start to be rotated in the rearward travel direction by means of the vehicle-mounted engine 13, in parallel with which an instruction for rotating the left foot shaft 28L in the rearward travel direction is given to the left electric motor 22L so that the left electric motor 22L having so far been stopped is activated, at step ST16.

Then, the rotating direction of the left foot shaft 28L is checked at step ST17. The electric drive apparatus 20 is determined satisfactory if the rotating direction of the left foot shaft 28L is the rearward travel direction, but determined unsatisfactory if the rotating direction of the left foot shaft 28L is not the rearward travel direction. This unsatisfactoriness is presumed to be due to an error of an electrical connection pertaining to the left electric motor 22L, such as a connection between left and right electric components. Upon completion of the rotating direction check of the left foot shaft 28L, the left electric motor 22L is deactivated at step ST18.

Then, an instruction for rotating the right foot shaft 28R in the rearward travel direction is given to the right electric motor 22R so that the right electric motor 22R having so far been stopped is activated, at step ST19.

Then, the rotating direction of the right foot shaft 28R is checked at step ST20. The electric drive apparatus 20 is determined satisfactory if the rotating direction of the right foot shaft 28R is the rearward travel direction, but determined unsatisfactory if the rotating direction of the left foot shaft 28L is not the rearward travel direction, at step ST20. This unsatisfactoriness is presumed to be due to an error of an electrical connection pertaining to the right electric motor 22R. Upon completion of the rotating direction check of the right foot shaft 28R, the right electric motor 22R is deactivated at step ST21.

As described above in relation to FIG. 6, the check of the hydraulic system can be performed in parallel with the check of the electrical connection between the left and right electric motors 22L and 22R. Namely, the hydraulic system can be inspected in parallel with another inspection item without separately inspecting the hydraulic system, by just the shift mode being set at "R".

Because the inspection flow shown in FIGS. 5 and 6 can be executed in a short time, the instant embodiment can reduce a necessary inspection time.

Whereas the instant embodiment has been described above in relation to the case where the left and right electric motors 22L and 22R etc. are accommodated together in the single case, each of the electric motors may be accommodated in a different case. Further, the method of the present invention can be applied to the electric drive apparatus before being mounted on the vehicle, in which case the bench test machine is not required.

However, in order to perform a proper final check of a completed vehicle, it is recommended that the inspection be conducted with the electric drive apparatus, having the left and right electric motors accommodated in the case, mounted on the vehicle placed on the bench test machine.

The present invention is well suited for application to a final check of a completed vehicle.

What is claimed is:

1. An inspection method for inspecting an electric drive apparatus as an inspection object, the electric drive apparatus including:

an electric motor; a sun gear mounted on a motor shaft of the electric motor; a planet gear meshing with the sun gear; a carrier rotatably supporting the planet gear; a foot shaft connected to the carrier; a ring gear meshing with the planet gear and surrounding the planet gear; a brake plate provided between a case enclosing the ring gear for switching the ring gear between a rotatable state and a non-rotatable state; a hydraulic piston for pressing the brake plate; and a one-way clutch provided between the case and the ring gear and constructed to place the ring gear in the non-rotatable state when the foot shaft rotates in a forward direction but place the ring gear in the rotatable state when the foot shaft rotates in a reverse direction, the electric drive apparatus being mounted on a vehicle, the vehicle having one of front and rear wheels driven by a vehicle-mounted engine and the other of the front and rear wheels driven by the electric drive apparatus, the inspection method comprising the steps of:

placing the vehicle on a bench test machine;

checking a number of co-rotations of the electric motor under such conditions that the front wheels are rotated in a forward travel direction by the engine and the rear wheels are rotated in the forward travel direction by rollers of the bench test machine while the electric motor is kept in a de-energized state with no hydraulic pressure applied to the hydraulic piston;

generating an instruction for increasing the hydraulic pressure to a predetermined pressure level on the basis of information that a shift mode of the vehicle is a reverse mode;

measuring the hydraulic pressure by a hydraulic gauge so as to determine whether the measured hydraulic pressure is the predetermined pressure level or over;

activating the electric motor to rotate one of left and right rear wheels in a rearward travel direction while the hydraulic pressure is applied to the hydraulic piston;

while keeping the electric motor activating step, checking whether the one of the left and right rear wheels is rotating in the rearward travel direction, and checking whether the other of the left and right rear wheels is rotating in the rearward travel direction.

2. The inspection method according to claim 1, wherein the electric drive apparatus includes left and right electric motors, left and right sun gears, left and right planet gears, left and right ring gears and left and right carriers, and wherein the left and right electric motors, the left and right sun gears, the left and right planet gears, the left and right ring gears, the left and right carriers, the brake plate, the hydraulic piston and the one-way clutch are accommodated together in the case.

* * * * *